(12) United States Patent
Singh et al.

(10) Patent No.: US 8,942,624 B2
(45) Date of Patent: Jan. 27, 2015

(54) APPARATUS, SYSTEM, AND METHOD FOR BACK-CHANNEL COMMUNICATION IN AN INDUCTIVE WIRELESS POWER TRANSFER SYSTEM

(75) Inventors: Manjit Singh, Fremont, CA (US);
Siamak Bastami, Gilroy, CA (US);
David Wilson, Soquel, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 223 days.

(21) Appl. No.: 13/436,135

(22) Filed: Mar. 30, 2012

(65) Prior Publication Data

US 2013/0260676 A1  Oct. 3, 2013

(51) Int. Cl.
*H04B 5/00* (2006.01)
*H01F 27/42* (2006.01)
*H01F 37/00* (2006.01)
*H01F 38/00* (2006.01)

(52) U.S. Cl.
USPC .......................................... 455/41.1; 307/104

(58) Field of Classification Search
CPC .... H04B 5/0025; H04B 5/0037; H04W 4/008
USPC .......... 455/41.1, 41.2; 307/104, 154; 320/108
See application file for complete search history.

(56) References Cited

U.S. PATENT DOCUMENTS

| | | | |
|---|---|---|---|
| 2009/0127937 A1* | 5/2009 | Widmer et al. | 307/149 |
| 2011/0164471 A1* | 7/2011 | Baarman et al. | 368/10 |
| 2011/0199045 A1* | 8/2011 | Hui et al. | 320/108 |
| 2012/0001495 A1* | 1/2012 | Urano | 307/104 |
| 2012/0001593 A1* | 1/2012 | Di Guardo | 320/108 |
| 2012/0175967 A1* | 7/2012 | Dibben et al. | 307/104 |
| 2012/0300511 A1* | 11/2012 | Itoh et al. | 363/37 |
| 2013/0082536 A1* | 4/2013 | Taylor et al. | 307/104 |
| 2013/0147279 A1* | 6/2013 | Muratov | 307/104 |
| 2013/0185213 A1* | 7/2013 | Insanic | 705/73 |
| 2014/0062212 A1* | 3/2014 | Sun et al. | 307/104 |
| 2014/0103870 A1* | 4/2014 | Baarman et al. | 320/108 |

* cited by examiner

*Primary Examiner* — Nguyen Vo
(74) *Attorney, Agent, or Firm* — TraskBritt P.C.

(57) ABSTRACT

An inductive wireless power transfer device comprises a transmitter that comprises a transmit coil configured to generate a wireless power signal to a coupling region in response to an input voltage, and a modulator configured to modulate the wireless power signal and encode data with the wireless power signal to establish a back-channel communication link from the transmitter to a receiver. An inductive wireless power receiving device comprises a receiver that comprises a receive coil configured to generate a time varying signal in response to receiving a modulated wireless power signal from a transmitter in a coupling region, and a demodulator configured to demodulate the modulated wireless power signal from an established back-channel communication link from the transmitter to a receiver. Related inductive wireless power transfer systems and methods for back-channel communication from the transmitter to the receiver of an inductive wireless power transfer system are disclosed.

2 Claims, 7 Drawing Sheets

APPARATUS, SYSTEM, AND METHOD FOR BACK-CHANNEL COMMUNICATION IN AN INDUCTIVE WIRELESS POWER TRANSFER SYSTEM

FIELD

Embodiments of the present disclosure relate generally to inductive wireless power transfer and, more particularly, to apparatuses, systems, and methods related to back-channel communication in an inductive wireless power transfer system.

BACKGROUND

Battery-powered devices (e.g., consumer electronic devices, electric and hybrid automobiles, etc.) are charged from a power source (e.g., AC power outlet) through a charging device. The charging device couples the battery to the power source through an adaptor. The cord extending between the power source and the battery-powered device can take up space. In situations where multiple devices require charging, each with their own charger and cord, the charging area can become cramped and inconvenient.

Approaches are being developed that use over-the-air or wireless power transmission between a transmitter and a receiver coupled to the electronic device. Wireless power transmission using inductive coil is one method considered as an untethered method for transferring power wirelessly through a coupled electromagnetic field. In inductive wireless power transmission, power is transferred by transmitting an electromagnetic field through a transmit coil. On the receiver side, a receiver coil may couple with the transmit coil through the electromagnetic field, thus receiving the transmitted power wirelessly. The distance between the transmitter and receiver coils at which efficient energy transfer can take place is a function of a coupling coefficient between the coils. The coupling efficiency may be significantly improved if the coils are sized and operated at such a frequency that they are physically within the so-called "near-field zone" of each other.

During power transfer from the transmitter to the receiver, data may be communicated between the transmitter and the receiver. Conventional methods of communication include one-way communication via a communication link from the receiver to the transmitter that is based on backscatter modulation in which the load is modulated on the receiver side. As a result, using conventional methods, only the receiver has the ability to send data to the transmitter. Other conventional methods that achieve two-way communication include separate RF coils, which require additional components that may increase cost, area, and complexity.

BRIEF SUMMARY

Embodiments of the present disclosure include an inductive wireless power transfer device. The inductive wireless power transfer device comprises a transmitter that includes a transmit coil configured to generate a wireless power signal to a coupling region in response to an input voltage, and a modulator configured to modulate the wireless power signal and encode data with the wireless power signal to establish a back-channel communication link from the transmitter to a receiver.

Another embodiment of the present disclosure includes an inductive wireless power receiving device. The inductive wireless power receiving device comprises a receiver having a receive coil configured to generate a time varying signal in response to receiving a modulated wireless power signal from a transmitter in a coupling region, and a demodulator configured to demodulate the modulated wireless power signal from an established back-channel communication link from the transmitter to a receiver.

Another embodiment of the present disclosure includes an inductive wireless power transfer system. The inductive wireless power transfer system comprises a transmitter having a transmit coil configured to generate a modulated wireless power signal in a coupling region for wireless power transfer, and a receiver having a receive coil configured to couple with the transmit coil by receiving the modulated wireless power signal and to generate an output signal in response thereto to provide power to a load, wherein the modulated wireless power signal includes characters.

Another embodiment of the present disclosure includes a method for communicating between a transmitter to a receiver in an inductive wireless power transfer system. The method comprises generating a wireless power signal through a transmit coil of a transmitter to a receive coil of a receiver, and modulating the wireless power signal on the transmitter side for communicating data over the wireless power signal from the transmitter to the receiver.

DETAILED DESCRIPTION

In the following description, reference is made to the accompanying drawings in which is shown, by way of illustration, specific embodiments of the present disclosure. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, a controller, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

Also, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer readable media. Computer-readable media includes both computer storage media and communication media, including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

Figure 1:
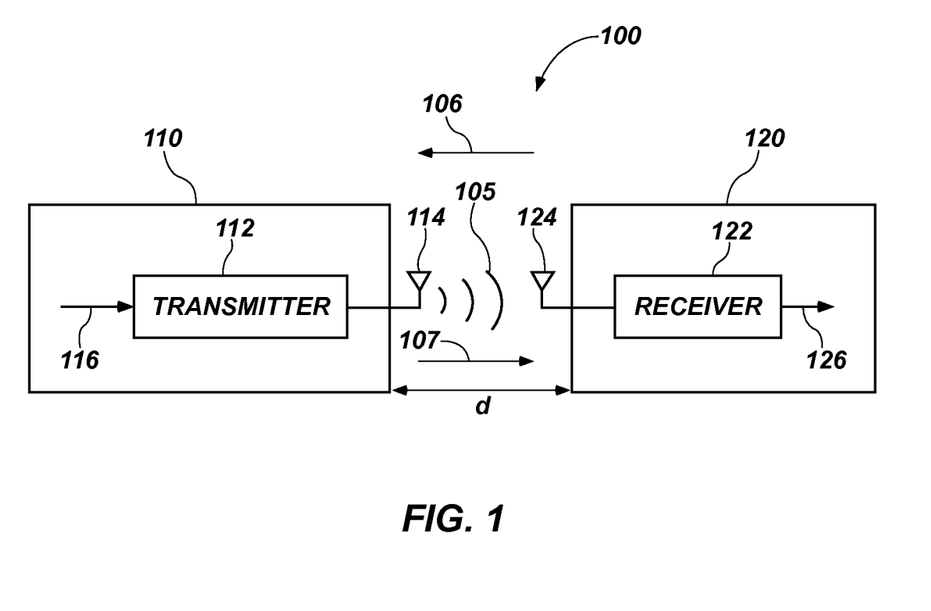
FIG. 1 is a schematic block diagram of an inductive wireless power transfer system.

FIG. 1 is a schematic block diagram of an inductive wireless power transfer system 100. The inductive wireless power transfer system 100 includes a wireless power transmitting apparatus 110 and a wireless power receiving apparatus 120. The wireless power transmitting apparatus 110 includes a transmitter 112 having a transmit coil 114 configured to generate an electromagnetic field 105 for providing energy transfer to the wireless power receiving apparatus 120. The wireless power receiving apparatus 120 includes a receiver 122 having a receive coil 124 configured to couple with the electromagnetic field 105. The transmit coil 114 and the receive coil 124 may be sized according to the particular devices and applications to be associated therewith. The electromagnetic field 105 may also be referred to as wireless power signal 105 for energy transfer from the transmitter 112 to the receiver 122.

An input signal 116 is provided to the transmitter 112 for providing the transmitter 112 with the power for generating the wireless power signal 105 that provides an energy transfer to the wireless power receiving apparatus 120. The receiver 122 couples to the wireless power signal 105 and generates an output signal 126 in response thereto. The output signal 126 may provide the power that is used by the wireless power receiving apparatus 120 for storing (e.g., charging a battery), consumption (e.g., providing system power), or both.

The transmitter 112 and the receiver 122 are separated by a distance (d). In some embodiments, the transmitter 112 and the receiver 122 may be configured according to a mutual inductance relationship, such that when the resonant frequency of the receiver 122 and the resonant frequency of the transmitter 112 are substantially identical, transmission losses between the transmitter 112 and the receiver 122 are minimal. Likewise, the frequency of the wireless power signal 105 may be set by the transmitter 112 at or neat the resonant frequencies of the coils 114, 124. As a result, an efficient energy transfer occurs by coupling a large portion of the energy in the near-field of the transmit coil 114 to the receive coil 124 rather than propagating most of the energy in an electromagnetic wave to the far-field. If the wireless power receiving apparatus 120 is in the near-field, a coupling mode may be developed between the transmit coil 114 and the receive coil 124. The area around the transmit coil 114 and receive coil 124 where this near-field coupling may occur may be referred to as a coupling region.

The desired distance (d) separating the transmitter 112 and the receiver 122 may be a standard distance (e.g., 2 mm) that is determined by the Wireless Power Consortium (WPC). In some embodiments, the transmit coil 114 and the receive coil 124 may include magnetically attractive elements that assist in ensuring that the transmitter 112 and the receiver 122 remain at a known fixed distance (e.g., 2 mm) during wireless power transfer. In other words, employing a magnetically-guided topology that aligns the transmitter 112 and the receiver 122 may ensure that the transmitter 112 and the receiver 122 align within a relatively tight fixed vertical distance. For example, the transmitter 112 may include a magnet, while the receiver 122 may include an attractor (or vice versa).

The transmit coil 114 and the receive coil 124 may be considered like antennas that may be configured as a "loop" antenna, which may also be referred to herein as a "magnetic" antenna or an "inductive" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive coil 124 within a plane of the transmit coil 114 where the coupling region of the transmit coil 114 may be more powerful.

The wireless power transmitting apparatus 110 may be a wireless power charger. The wireless power receiving apparatus 120 may be a mobile electronic device, such as a cell phone, smart phone, media player (e.g., mp3 player), electronic reader, tablet, personal digital assistant (PDA), camera, lap top computer, and personal electronic device in which wireless power may be received. The wireless power receiving apparatus 120 may also be a less mobile electronic device, such as a television, personal computer, media player (e.g., DVD player, Blu-ray Disc player, etc.) or any other device that may operate by, and/or store electrical power. The wireless power receiving apparatus 120 may be one of a number of other items, such as an automobile or any other devices that may include batteries that may be charged through the wireless power transmitting apparatus 110. In some embodiments, the wireless power transmitting apparatus 110 may be a device that may, at times, also be the recipient of wireless power transfer. In other words, some devices may be configured as both a wireless power transmitting apparatus 110 and a wireless power receiving apparatus 120, such that the device may transmit wireless power or receive wireless power depending on the mode of operation.

Embodiments of the present disclosure include a back-channel communication link 107 to transmit data from the transmitter 112 to the receiver 122. The transmitter 112 may be configured to establish the back-channel communication link 107 by modulating the wireless power signal 105. In particular, the conversion gain of the wireless power signal 105 may be modulated, which may be detected responsive to the wireless power signal 105 being received and demodulated by the receiver 122. While the back-channel communication link 107 is shown in FIG. 1 (among other figures) as a separate arrow from the wireless power signal 105, it should be appreciated that the communication signal is transmitted with the wireless power signal 105 through the same coils (through transmit coil 114 and receive coil 124). Thus, the wireless power signal 105 carries the communication data of the back-channel communication link 107 when the wireless power signal 105 is modulated as described herein. The arrow for the back-channel communication link 107 is merely shown separately for the purpose of indicating a direction of communication data flow.

Similar to conventional wireless power transfer systems, embodiments of the present disclosure may further include a forward-channel communication link 106 for transmitting data from the receiver 122 to the transmitter 112, such as via backscatter modulation. As discussed above, conventional wireless power transfer systems may be limited to one-way communication from the receiver 122 to the transmitter 112, or else require separate RF coils for transmitting data separately from the transmit coil 114 and receive coil 124. Like the back-channel communication link 107, the forward-channel communication link 106 is shown in FIG. 1 (among other figures) as a separate arrow from the wireless power signal 105; however, it should also be appreciated that the communication signal is transmitted with the wireless power signal 105 through the same coils. Thus, the wireless power signal 105 carries the communication data of the forward-channel communication link 106 when the wireless power signal 105 is modulated according to the conventional principles of back scatter modulation. The arrow for the forward-channel communication link 106 is also shown separately for the purpose of indicating a direction of communication data flow.

Having two-way communication enables the transmitter 112 and the receiver 122 to establish a secure communication for a variety of different purposes, such as the transmitter 112 authenticating the type of receiver 122 that the transmitter 112 is talking to, or to authenticate a particular battery type to know that the battery of the receiver 122 is legitimate prior to generating the wireless power signal 105. Other data may be shared between the transmitter 112 and receiver 122 regarding the performance of the inductive wireless power transfer system 100, to assist with foreign object detection, among other reasons.

Figure 2:
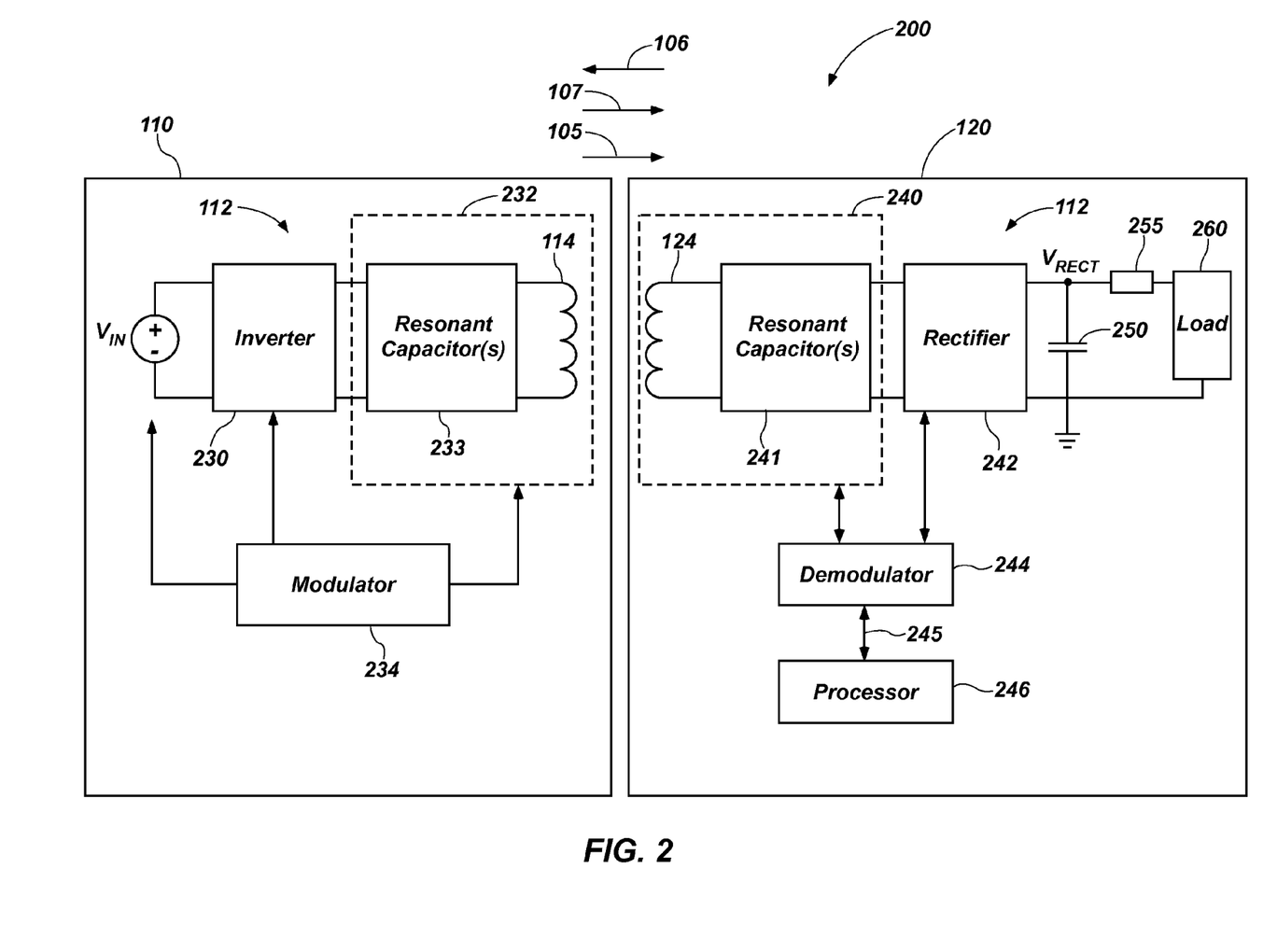
FIG. 2 is a schematic block diagram of an inductive wireless power transfer system according to an embodiment of the present disclosure.

FIG. 2 is a schematic block diagram of an inductive wireless power transfer system 200 according to an embodiment of the present disclosure. The inductive wireless power transfer system 200 includes a wireless power transmitting apparatus 110 and a wireless power receiving apparatus 120, as previously discussed above with respect to FIG. 1. The wireless power transmitting apparatus 110 may be a wireless power charger. The wireless power receiving apparatus 120 may be any device that may provide electric power to a load 260. The wireless power receiving apparatus 120 may use the received wireless power for system power, for charging an energy storage unit (e.g., battery), or both. In other words, the load 260 may be system components of a mobile device, a battery, etc.

In some embodiments, the wireless power transmitting apparatus 110 may also be configured to receive wireless power. In addition, some embodiments may include a wireless power receiving apparatus 120 that may also be configured to transmit wireless power. In other words, embodiments of the present disclosure may include an apparatus that includes the components described herein as being part of either the wireless power transmitting apparatus 110 or the wireless power receiving apparatus 120 and may operate in either a transmit mode or a receive mode.

The wireless power transmitting apparatus 110 includes a transmitter 112 including a transmit coil 114 configured to generate an wireless power signal 105 for providing energy transfer to the wireless power receiving apparatus 120. The wireless power receiving apparatus 120 includes a receiver 122 including a receive coil 124 configured to receive the wireless power signal 105 for inductive coupling with the transmit coil 114.

The transmitter 112 may further include an inverter 230, a resonant tank 232, and a modulator 234. The resonant tank 232 may include one or more capacitors (e.g., resonant capacitor(s) 233) coupled with an inductor (e.g., the transmit coil 114). The capacitors and inductors may be configured in an LC network, such as being coupled in series or parallel. The inverter 230 is coupled between the input voltage ($V_{IN}$) and the resonant tank 232. The modulator 234 may be coupled with one or more of the inverter 230, the resonant tank 232, and the input voltage ($V_{IN}$) in order to modulate the wireless power signal 105 such that communication may be achieved from the transmitter 112 to the receiver 122, as will be described in more detail below. The transmitter 112 may include additional elements (e.g., power sense element) that are not shown herein, that may perform functions such as power monitoring, foreign object detection, etc. It will also be appreciated that the transmitter 112 may include a demodulator for receiving and demodulating communication received from the receiver 122.

The receiver 122 may further include a resonant tank 240, a rectifier 242, a demodulator 244, and a processor 246. The resonant tank 240 may include an inductor (e.g., receive coil 124) coupled with one or more capacitor (e.g., resonant capacitor(s) 241). The resonant tank 240 is coupled with the rectifier 242, which may further be coupled to the load 260. The demodulator 244 may be coupled with one or more of the resonant tank 240, the rectifier 242, and the processor 246 in order to demodulate the received wireless power signal 105 and transmit a demodulated signal 245 to the processor 246 for analysis or other processing. The receiver 122 may include additional elements (e.g., power sense element) that are not shown herein, that may perform functions, such as power monitoring, foreign object detection, etc. It will also be appreciated that the receiver 122 may include a modulator for modulating communication to the receiver 122.

In operation of the transmitter 112, the inverter 230 and the resonant tank 232 convert the input signal ($V_{IN}$) (a DC signal) to an AC signal that can be used to transmit the wireless power signal 105 to the receiver 122. The inverter 230 may be configured as a half-bridge inverter, a full-bridge inverter, with three switches, or some other combination of switches in a switch network. As AC current flows through the transmit coil 114, the wireless power signal 105 is generated. Thus, the wireless power signal 105 is a time-varying signal that is substantially sinusoidal, having a frequency based on the switching frequency ($F_{SW}$) of the inverter 230. The resonant tank 232 of the transmitter 112 may have a resonant frequency that may be tuned based on the inductance of the transmit coil 114 and the capacitance of the plates and configuration of the resonant capacitor(s) 233. The inverter 230 may cause the wireless power signal 105 to have a frequency that is approximately the resonant frequency of the resonant tank 232. In some embodiments, the frequency of the wireless power signal 105 may differ from the resonant frequency of the resonant tank 232, such as to reduce the peak to peak current through the transmit coil 114 and/or the receive coil 124.

In operation of the receiver 122, the wireless power signal 105 is received by the receiver 122 and current is generated and flows through the receive coil 124. In other words, the transmit coil 114 and the receive coil 124 may be inductively coupled. Thus, the wireless power transfer system 200 may also be referred to as an inductive wireless power transfer system. The resonant frequency of the resonant tank 240 may be based on the inductance of the receive coil 124 and the capacitance of the plates of the resonant capacitor(s) 241. If the resonant frequencies of the resonant tanks 232, 240 are substantially the same, the coupling efficiency and wireless power transfer may be improved. During wireless power transfer between the transmitter 112 and the receiver 122, inductive coupling may be established therebetween. The resonant tank 240 generates a time varying current (an AC signal) from coupling with the wireless power signal 105 to the rectifier 242 generating the output voltage. The rectifier 242 converts that AC signal to a DC signal. In other words, the rectifier 242 has an AC side and a DC side. The rectifier 242 may be configured as an asynchronous rectifier (e.g., including diodes), or as a synchronous rectifier (e.g., including switches).

The output voltage ($V_{RECT}$) may be filtered by a filter capacitor 250 and output to the load 260 through voltage regulator 255. The filter capacitor 250 and the voltage regulator 255 may be used in some embodiments to further smooth the DC signal and set it to an appropriate DC voltage as a power output for use by the load 260. The load 260 may be system components of an electronic device such that the output voltage ($V_{RECT}$) is used to provide system power the electronic device. The load 260 may also be an energy storage device (e.g., battery) such that the output voltage ($V_{RECT}$) is used to provide the charging power for the energy storage device. Some embodiments may utilize the output voltage ($V_{RECT}$) to provide both system power and charging power simultaneously.

As discussed above, conventional wireless power transfer systems include a forward-channel communication link 106 for transmitting data from the receiver 122 to the transmitter 112, such as via backscatter modulation. Embodiments of the present disclosure, however, include a back-channel communication link 107 to transmit data from the transmitter 112 to the receiver 122. As a result, in some embodiments, the wireless power transfer system 200 may perform two-way communication through the transmit and receive coils 114, 124. Back-channel communication through the back-channel communication link 107 may be based, at least in part, on conversion gain modulation in the inductive wireless power transfer system 200. In other words, the modulator 234 of the transmitter 112 may be configured to modulate the conversion gain for the wireless power signal 105 according to an encoding scheme to transmit data from the transmitter 112 to the receiver 122. The conversion gain may be determined as the net gain from the output of the receiver 122 to the input of transmitter 112. For example, the conversion gain is a transfer function that may be defined as $V_{RECT}/V_{IN}$.

Modulation of the conversion gain may be achieved by adjusting the characteristics of the total conversion gain by a number of different methods that alter at least one of the current or voltage of the transmit coil 114. For example, in one embodiment, the switching frequency ($F_{SW}$) of the control signals for the inverter 230 may be varied. In another embodiment, the duty cycle of the control signals for the inverter 230 may be varied. In another embodiment, the impedance (Z) of the resonant tank 232 of the transmitter 112 may be varied. In another embodiment, the input voltage ($V_{IN}$) of the inverter 230 may be varied. By adjusting one or more of these characteristics, the conversion gain transfer function may be modified by an amount that is sufficient for receiver 122 to recognize and demodulate.

Figure 3A:
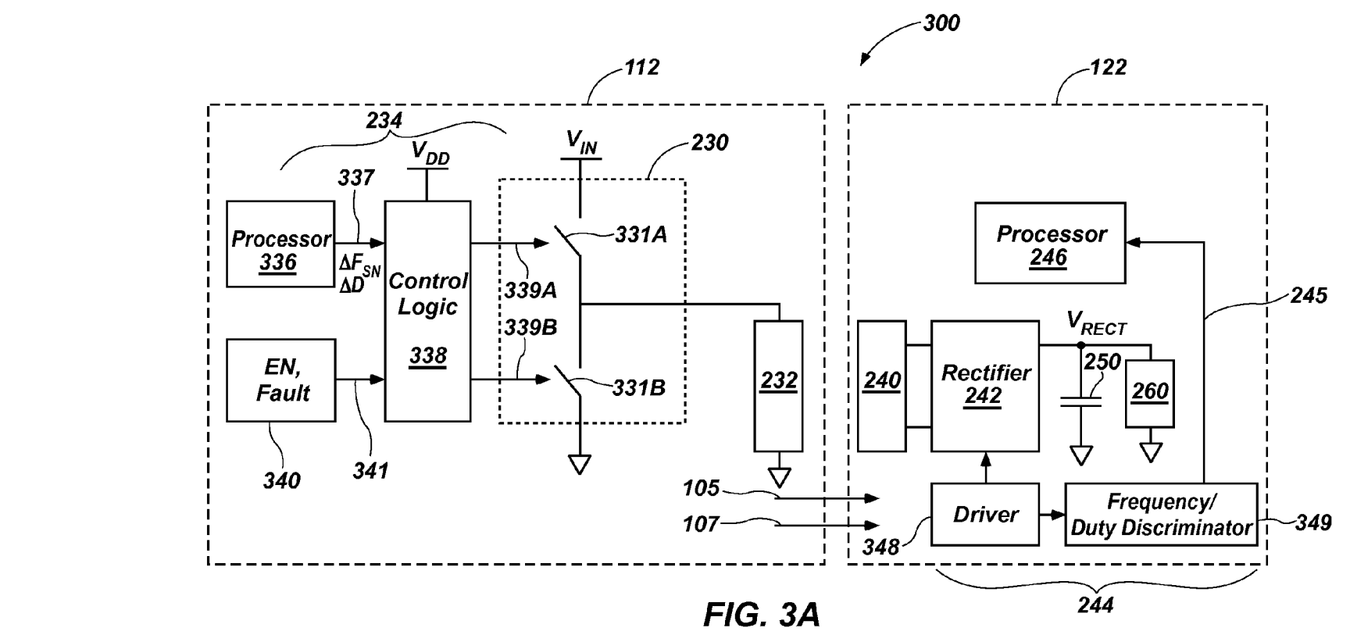
FIG. 3A is a schematic block diagram of a wireless power transfer system according to an embodiment of the present disclosure.

FIG. 3A is a schematic block diagram of a wireless power transfer system 300 according to an embodiment of the present disclosure. The wireless power transfer system 300 includes the transmitter 112 and the receiver 122, which may operate generally as described above to transmit and receive the wireless power signal 105.

The transmitter 112 may include the inverter 230, the resonant tank 232 and the modulator 234. While the inverter 230 is shown in FIG. 3 as being configured as a half bridge inverter including switches 331A, 331B, other inverter configurations (e.g., full bridge inverters, and other switching networks) are contemplated. A processor 336 may be configured to transmit a control signal 337, which sets a switching frequency ($F_{SW}$) and a duty cycle (D) for the switches 331A, 331B of the inverter 230. The processor 336 may also include other peripherals (e.g., memory). Memory may include non-volatile memory (e.g., ROM) and volatile memory (e.g., RAM). In some embodiments, the processor 336 may sample signals to determine the power-transmit frequency and the transmit resonance frequency. Analysis of these frequencies may be used to form a control loop to adjust the power-transmit frequency. As a non-limiting example, the control loops may include a linear feedback control system, such as, for example, a proportional integral derivative controller. Of course, other feedback/control topologies may also be used.

Control logic 338 may include logic and drivers to generate control signals 339A, 339B to control operation of the switches 331A, 331B responsive to the control signal 337 from the processor 336. For example, a first control signal 339A may control a first switch 331A, and a second control signal 339B may control a second switch 331B, such that the switches 331A, 331B are complementary enabled. In other words, the second switch 331B is closed while the first switch 331A is open, and vice versa. The switches 331A, 331B alternate between being open and closed according to the switching frequency ($F_{SW}$). The switches 331A, 331B may also be controlled to be enabled according to some duty cycle. For example, a 50% duty cycle means that the first switch 331A and the second switch 331B are opened and closed for the same amount of time relative to each other. The fault detection and enable block (EN, Fault) 340 may be configured to enable and disable the control logic 338 via enable signal 341, such that the wireless power signal 105 may be either enabled or disabled. For example, the fault detection and enable block 340 may be configured to detect an unsafe fault condition (e.g., voltage and/or current of the resonant tank 232 may be too high) and disable the control logic 338 and cease wireless power transfer.

In the embodiment of FIG. 3A, the modulator 234 may be configured as a processor 336 and control logic 338 to control the timing of the switches 331A, 331B of the inverter 230. The processor 336 is configured to generate the control signal 337 to the control logic 338, which sets the switching frequency ($F_{SW}$) and the duty cycle (D) of the switches 331A, 331B of the inverter 230. The switching frequency ($F_{SW}$) determines the frequency of the wireless power signal 105. The frequency of the wireless power signal 105 may also be referred to as the carrier frequency.

In operation, the modulator 234 modulates the conversion gain of the wireless power signal 105 for an amount of time to represent the bit of data. For example, the modulator 234 may vary at least one of the switching frequency ($F_{SW}$) and the duty cycle (D). For example, the switching frequency ($F_{SW}$) may be varied while the duty cycle (D) remains constant. In another embodiment, the duty cycle (D) may be varied while the switching frequency ($F_{SW}$) remains constant. The processor 336 may send a control signal 337 informing the control logic 338 of the desired switching frequency ($F_{SW}$) and duty cycle (D).

To encode information onto the wireless power signal 105 through conversion gain modulation, the control signal 337 may indicate to the control logic 338 the change to be made. As either the switching frequency ($F_{SW}$) or the duty cycle (D) is adjusted, the voltage and/or current through the transmit coil 114 may also be adjusted. Thus, the conversion gain is frequency dependent with respect to the switching frequency ($F_{SW}$), and is also dependent on the duty cycle (D). As a result, as either the switching frequency ($F_{SW}$) or the duty cycle (D) is modulated, the transfer function behavior (i.e., conversion gain) may also change. As a result, the modulator 234 may encode the wireless power signal 105 with a packet of data according to an encoding scheme that adjusts either the switching frequency ($F_{SW}$) or the duty cycle (D) to represent the bits. Other encoding schemes are also contemplated, such as Manchester, etc.

Figure 3B:
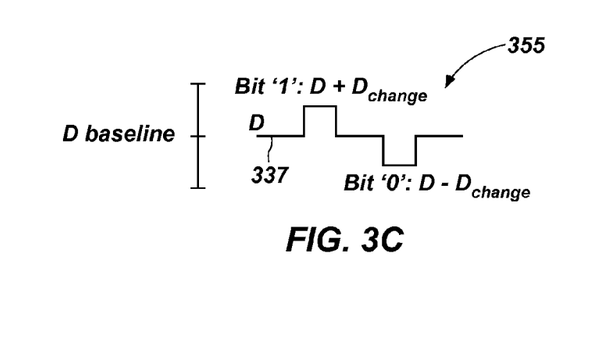
FIG. 3B shows a waveform for the control signal being varied for a change in the switching frequency ($F_{SW}$)

FIG. 3B shows a waveform 350 for the control signal 337 being varied for a change in the switching frequency ($F_{SW}$). When no data is being sent, the switching frequency ($F_{SW}$) may be set to a baseline switching frequency ($F_{SW}$) (e.g., 200 kHz). If a bit '1' is to be sent to the receiver 122 over the wireless power signal 105, the control signal 337 may adjust (e.g., increase) the switching frequency ($F_{SW}$) from the baseline by a predetermined frequency ($F_{CHANGE}$) (e.g., 5 kHz). Thus, a bit '1' is represented by a change in the control signal 337 such that the new switching frequency for that moment is the baseline frequency plus the frequency change (i.e., $F_{SW}$+ $F_{CHANGE}$) (e.g., 205 kHz). Likewise, if a bit '0' is to be sent to the receiver 122 over the wireless power signal 105, the control signal 337 may adjust (e.g., decrease) the switching frequency ($F_{SW}$) from the baseline (e.g., 200 kHz) by a predetermined frequency ($F_{CHANGE}$) (e.g., 5 kHz). Thus, a bit '0' may be represented by a change in the control signal 337 such that the new switching frequency for that moment is the baseline frequency minus the frequency change (i.e., $F_{SW}$- $F_{CHANGE}$) (e.g., 195 kHz). During the time of varying the switching frequency ($F_{SW}$), the duty cycle (D) may remain constant.

Figure 3C:
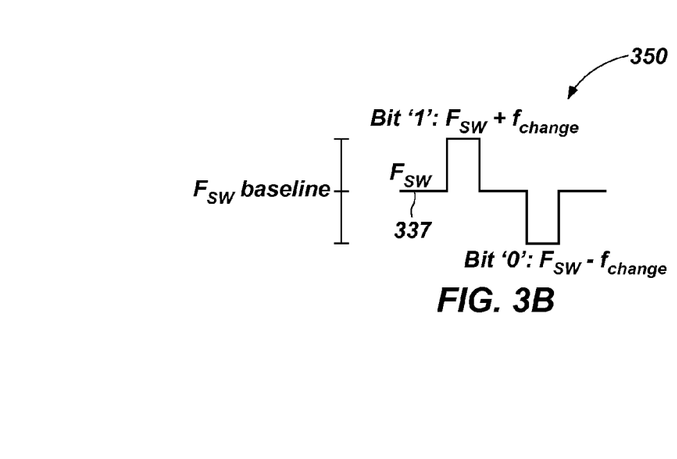
FIG. 3C shows a wave for another embodiment in which the control signal is varied for a change in the duty cycle (D)

FIG. 3C shows a waveform 355 for another embodiment in which the control signal 337 is varied for a change in the duty cycle (D). When no data is being sent, the duty cycle (D) may be set to a baseline duty cycle (D) (e.g., 50%). If a bit '1' is to be sent to the receiver 122 over the wireless power signal 105, the control signal 337 may increase the duty cycle (D) from the baseline (e.g., 50%) by a predetermined amount ($D_{CHANGE}$) (e.g., 5%). Thus, a bit '1' is represented by a change in the control signal 337 such that the new duty cycle (D) for that moment is the baseline duty cycle plus the duty cycle change (i.e., D+$D_{CHANGE}$) (e.g., 55%). Likewise, if a bit '0' is to be sent to the receiver 122 over the wireless power signal 105, the control signal 337 may decrease the duty cycle (D) from the baseline (e.g., 50%) by a predetermined amount ($D_{CHANGE}$) (e.g., 5%). Thus, a bit '0' is represented by a change in the control signal 337 such that the new duty cycle for that moment is the baseline duty cycle minus the duty cycle change (i.e., D–$D_{CHANGE}$) (e.g., 45%). During the time of varying the switching duty cycle (D), the switching frequency ($F_{SW}$) may remain constant.

Referring again specifically to FIG. 3A, on the receiver 122 side, the receiver 122 may include the resonant tank 240, the rectifier 242, the demodulator 244, the processor 246, the filter capacitor 250, and the load 260. The demodulator 244 may be configured to demodulate the received wireless power signal 105 by monitoring characteristics of the received wireless power signal 105. The demodulator 244 may transmit the demodulated signal 245 to the processor 246 for analysis or further processing. The receiver 122 may further generate the output voltage ($V_{RECT}$) to provide to the load 260 as described above. Although the figures (e.g., FIG. 3A) do not specifically show all elements described herein, such as the voltage regulator 255 (FIG. 2), such elements may be present in the various embodiments of the present disclosure even if not shown.

The demodulator 244 of the receiver 122 may be configured as a driver 348 for the rectifier 242 and a frequency/duty cycle discriminator 349. As described above, the rectifier 242 may be configured as a synchronous rectifier controlled by switches (not shown). The driver 348 may control such switches. For example, the driver 348 may to drive switches of the rectifier 242 to be in sync with the frequency of the incoming wireless power signal 105 in order to rectify the incoming AC voltage to a DC voltage. Thus, the driver circuitry of the driver 348 may have the timing information (e.g., frequency, duty cycle of the wireless power signal 105) when the switches of the rectifier 242 are enabled. The frequency/ duty cycle discriminator 349 may monitor the signals from the driver 348 and read this timing info to determine the incoming frequency and the duty cycle of the wireless power signal 105 to generate the demodulated signal 245 transmitted to the processor 246. Thus, as the transmitter 112 modulates the conversion gain (by adjusting the switching frequency ($F_{SW}$) or the duty cycle (D)) of the wireless power signal 105, the processor 246 may compare the demodulated signal 245 to the expected baseline frequency and/or duty cycle in order to detect the changes in the demodulated signal 245 to analyze and otherwise process the data. Because some conventional receivers employ the driver 348 and the frequency/duty cycle discriminator 349 that are configured for other purposes unrelated to the function of the demodulator 244, such an approach may require only reconfiguration of these components to perform to described functions. Doing so may reduce or eliminate the need to add new components that are not present in conventional receivers, which may provide this additional functionality with little to no increase in cost or silicon area over conventional receiver chipsets.

If the conversion gain is modulated by varying the switching frequency ($F_{SW}$) (e.g., FIGS. 3A, 3B) or the duty cycle (D) (e.g., FIGS. 3A, 3C) of the control signals 335A, 335B of the switches 331, 332 of the inverter 230, the demodulator 244 of the receiver 122 may detect the frequency or duty cycle of the incoming wireless power signal 105 to ascertain timing and recover the message.

Figure 4A:
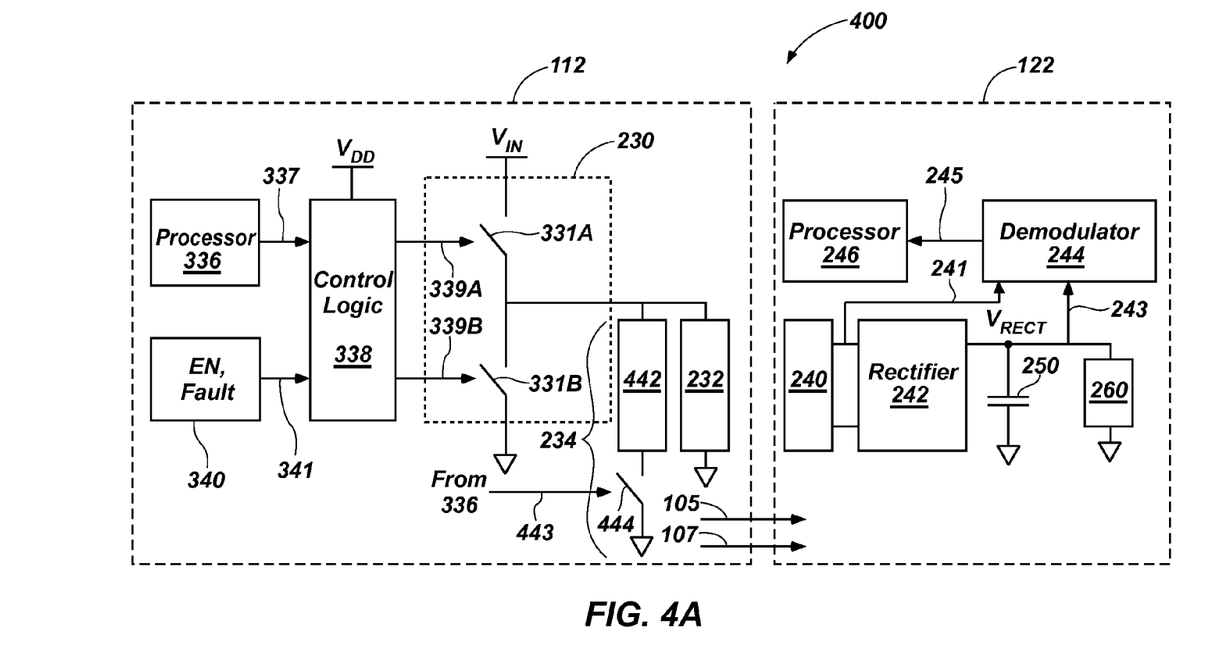
FIG. 4A is a schematic block diagram of an inductive wireless power transfer system according to an embodiment of the present disclosure.

FIG. 4A is a schematic block diagram of an inductive wireless power transfer system 400 according to an embodiment of the present disclosure. The wireless power transfer system 400 includes the transmitter 112 and the receiver 122, which may operate generally as described above to transmit and receive the wireless power signal 105. For example, the transmitter 112 may include the inverter 230 and the resonant tank 232 for transmitting the wireless power signal 105 at some frequency. The receiver 122 may include the resonant tank 240, the rectifier 242, filter capacitor 250, and load 260 to receive the wireless power signal 105 to generate the output voltage ($V_{RECT}$) for the load 260.

In the embodiment of FIG. 4A, the switching frequency ($F_{SW}$) and the duty cycle (D) of the switches 331A, 331B may remain constant during wireless power transfer, and the modulation of the wireless power signal 105 may be achieved through modulation of the impedance of the output of the transmitter 112. In other words, in this embodiment the modulator 234 is configured to modulate the conversion gain of the wireless power signal 105 by altering the impedance on the output of the transmitter 112. In particular, the modulator 234 may include an impedance element 442 serially coupled with a switch 444. The impedance element 442 and the switch 444 may be coupled in parallel with the resonant tank 232. The switch 444 may be controlled by a control signal 443 for encoding the wireless power signal 105 with the proper data. The control signal 443 may be generated by the processor 336.

The impedance element 442 may be any element that may affect the complex impedance of the output of the transmitter 112. For example, the impedance element 442 may include one or more capacitors, inductors, including a network having combinations thereof. In FIG. 4A, the impedance element 442 is shown as a separate element from the resonant tank 232; however, in some embodiments, the resonant tank 232 itself may be configured to adjust its complex impedance. For example, one or more switches may be coupled to the capacitor-inductor network of the resonant tank 232 to enable and disable such switches. When coupling such a switch to an inductor, the switch may be coupled to the end of the inductor, or at an intermediate tapping point of the inductor (e.g., a center-tap inductor). As a result, the modulator 234 may be configured to adjust the complex impedance of the transmitter 112 and modulate the wireless power signal 105 to encode data therewith.

For the detection scheme on the receiver 122 side, the demodulator 244 is coupled to receive and process the output voltage ($V_{RECT}$) to generate the demodulated signal 245 received by the processor 246. The output voltage ($V_{RECT}$) may be the time varying signal generated by the receive coil 240 (e.g., AC signal 241) prior to being rectified, or the output signal generated by the rectifier (e.g., DC signal 243). In other words, the demodulator may receive the back-channel signal for demodulation from either the AC side of the rectifier 242 or the DC side of the rectifier 242.

When no data is being transmitted over the wireless power signal 105, the output voltage ($V_{RECT}$) is expected to be a relatively constant voltage. By modulating the wireless power signal 105 (e.g., through adjusting the impedance of the transmitter 112), the output voltage ($V_{RECT}$) may fluctuate. As fluctuations in the output voltage ($V_{RECT}$) are detected, the processor 246 may determine the presence of the particular bits and recover the message according to the encoding scheme for the data.

Figure 4B:
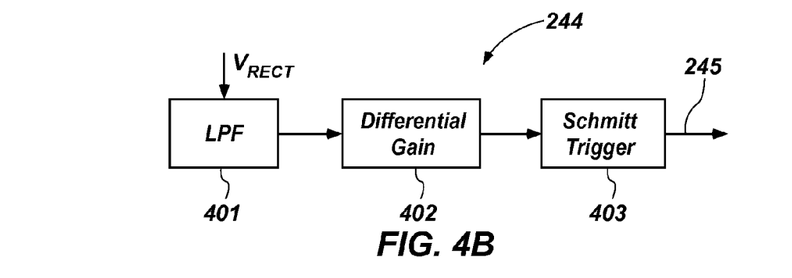
FIG. 4B is a schematic block diagram of demodulator of FIG. 4A according to an embodiment of the present disclosure.

FIG. 4B is a schematic block diagram of demodulator 244 of FIG. 4A, according to an embodiment of the present disclosure. The demodulator 244 includes a low pass filter (LPF) 401, a differential gain amplifier 402, and a Schmitt trigger 403 coupled in series to receive the output voltage ($V_{RECT}$) and generate the demodulated signal 245. The low pass filter 401 is configured to attenuate (e.g., remove) the high frequency of the carrier frequency for the wireless power signal 105. The filtered signal is gained up by the differential gain amplifier 402, and converted to a digital signal through the Schmitt trigger 403 to generate the demodulated signal 245. The demodulated signal 245 is transmitted to the processor 246 to recover the message according to the encoding scheme for the data.

As described above, the output voltage ($V_{RECT}$) may be the time varying signal generated by the receive coil 240 (e.g., AC signal 241) prior to being rectified, or the output signal generated by the rectifier (e.g., DC signal 243). Even though the DC signal 243 is described as a DC signal, the carrier frequency may not be completely attenuated such that passing the signal through the demodulator 244 may be desired to further attenuate such frequencies.

While the detection scheme of monitoring the output voltage ($V_{RECT}$) is described in FIGS. 4A, 4B as being responsive to adjusting the complex impedance of the transmitter 112, this detection scheme may be used for the other embodiments described herein. For example, the description above relating to the detection and recover of the message applies to the configurations for modulating the wireless power signal 105 described below with reference to FIGS. 5, 6A, and 6B.

Additionally, while the detection scheme of FIG. 3A describes monitoring the frequency and/or duty cycle of the wireless power signal 105 through the frequency/duty cycle discriminator 349, embodiments may also include monitoring the output voltage ($V_{RECT}$) as in FIGS. 4A, 4B even if the modulation scheme is based on adjusting the switching frequency ($F_{SW}$) or the duty cycle (D) as in FIGS. 3A, 3B, 3C. This is because the output voltage ($V_{RECT}$) may also fluctuate in response to changes made to the frequency and the duty cycle of the wireless power signal 105.

Figure 5:
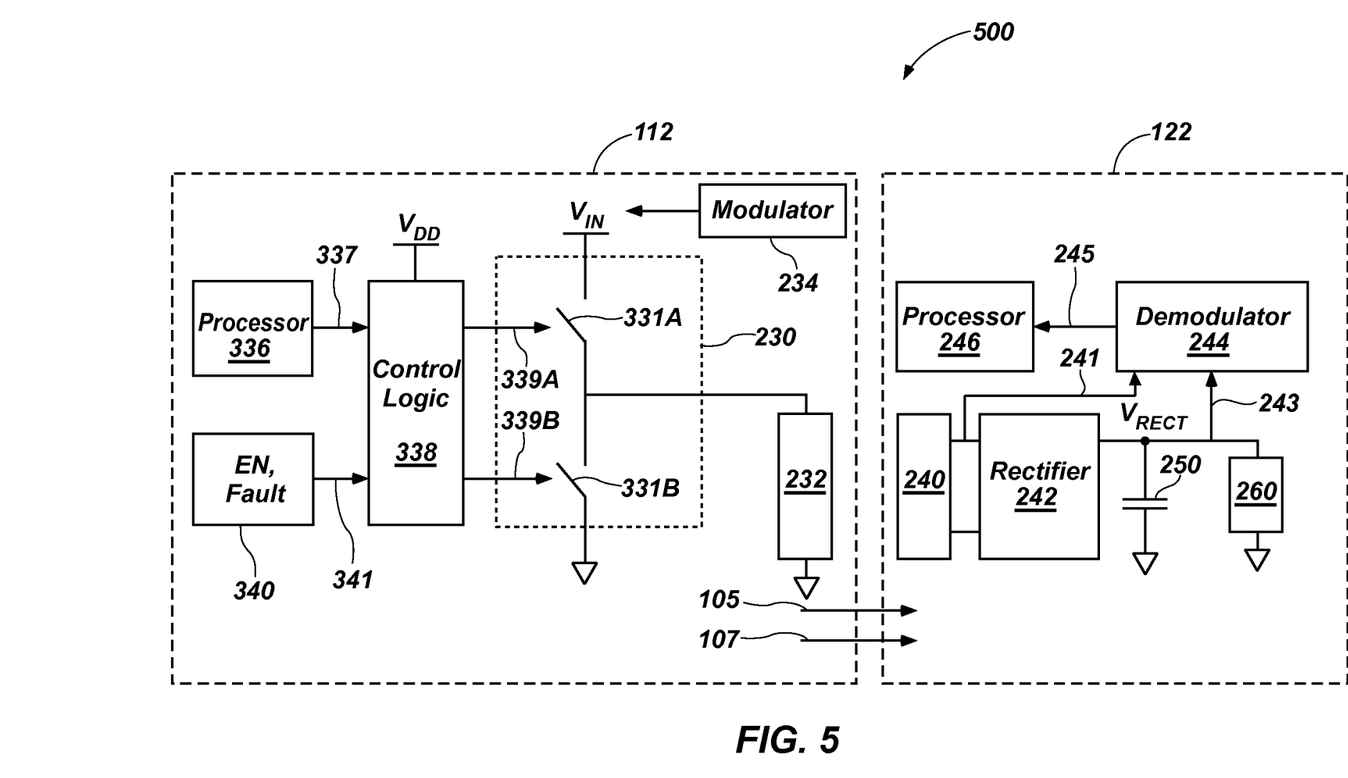
FIG. 5 is a schematic block diagram of an inductive wireless power transfer system according to an embodiment of the present disclosure.

FIG. 5 is a schematic block diagram of an inductive wireless power transfer system 500 according to an embodiment of the present disclosure. The wireless power transfer system 500 includes the transmitter 112 and the receiver 122, which may operate generally as described above to transmit and receive the wireless power signal 105. For example, the transmitter 112 may include the inverter 230 and the resonant tank 232 for transmitting the wireless power signal 105 at some frequency. The receiver 122 may include the resonant tank 240, the rectifier 242, filter capacitor 250, and load 260 to receive the wireless power signal 105 to generate the output voltage ($V_{RECT}$) for the load 260.

In this embodiment, the modulator 234 may be configured to modulate the conversion gain by adjusting the input voltage ($V_{IN}$). For example, the modulator 234 may include a switching regulator (e.g., buck converter, boost converter, etc.), a low drop-out (LDO) regulator, etc., configured to adjust the input voltage to different values. For example, a baseline voltage (e.g., 19V) may be adjusted up and down by a voltage difference (e.g., ±5V). Thus, the embodiment of FIG. 5 involves a physical change of the voltage input to the inverter 230. Adjusting the input voltage ($V_{IN}$) may cause adjustments to the output voltage ($V_{RECT}$) on the receiver 122 side, which may be monitored and demodulated as described above with respect to FIGS. 4A and 4B.

Figure 6A:
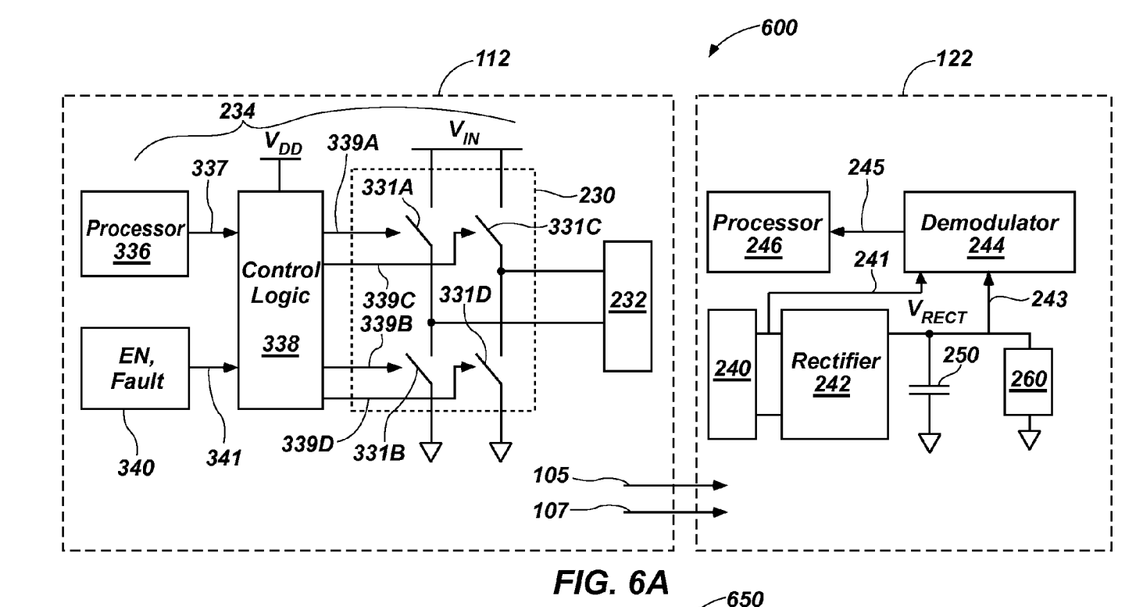
FIG. 6A is a schematic block diagram of an inductive wireless power transfer system according to an embodiment of the present disclosure.

FIG. 6A is a schematic block diagram of an inductive wireless power transfer system 600, according to an embodiment of the present disclosure. The wireless power transfer system 600 includes the transmitter 112 and the receiver 122, which may operate generally as described above to transmit and receive the wireless power signal 105. For example, the transmitter 112 may include the inverter 230 and the resonant tank 232 for transmitting the wireless power signal 105 at some frequency. The receiver 122 may include the resonant tank 240, the rectifier 242, filter capacitor 250, and load 260 to receive the wireless power signal 105 to generate the output voltage ($V_{RECT}$) for the load 260.

In this embodiment, rather than physically adjusting the input voltage ($V_{IN}$) to the inverter 230 (as in FIG. 5), the modulator 234 may be configured to modulate the conversion gain by adjusting the effective input voltage ($V_{IN}$) of the transmitter 112. In other words, overall effect of the modulation of FIG. 6A may be similar to that of FIG. 5. Referring specifically to FIG. 6A, the modulator 234 may include the processor 336, the control logic 338, and the inverter 230. The inverter 230 may be configured as a full bridge inverter having a plurality of switches 331A, 331B, 331C, 331D controlled by control signals 339A, 339B, 339C, 339D from the control logic 338. The processor 336 transmits the control signal 337 to the control logic 338 to control the timing of the control signals 339A, 339B, 339C, 339D and switches 331A, 331B, 331C, 331D. As described above, with respect to FIG. 3, the control signal 337 may determine the switching frequency ($F_{SW}$) and duty cycle (D), which in turn determines the frequency of the wireless power signal 105. In this embodiment, however, the modulator 234 may maintain a constant switching frequency ($F_{SW}$) and duty cycle (D). In other words, the modulator 234 of FIG. 6A does not adjust either the switching frequency ($F_{SW}$) or duty cycle (D) for conversion gain modulation and encoding of data on the wireless power signal 105. Instead, the modulator 234 modulates the conversion gain by adjusting the phases of the control signals 339A, 339B, 339C, 339D to the inverter 230 relative each other.

Figure 6B:
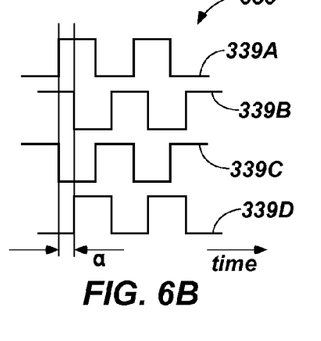
FIG. 6B is a waveform showing the control signals to the inverter according to an embodiment of the present disclosure.

For example, FIG. 6B is a waveform 650 showing the control signals 339A, 339B, 339C, 339D to the inverter 230 according to an embodiment of the present disclosure. Each of the control signals 339A, 339B, 339C, 339D are shown to be slightly out of phase with each other by some amount (α), which has the effect of altering the voltage actually received by the resonant tank 232 without physically adjusting the input voltage ($V_{IN}$) itself. Therefore, adjusting the effective input voltage ($V_{IN}$) may cause adjustments to the output voltage ($V_{RECT}$) on the receiver 122 side, which may be monitored and demodulated as described above with respect to FIGS. 4A and 4B.

Figure 7:
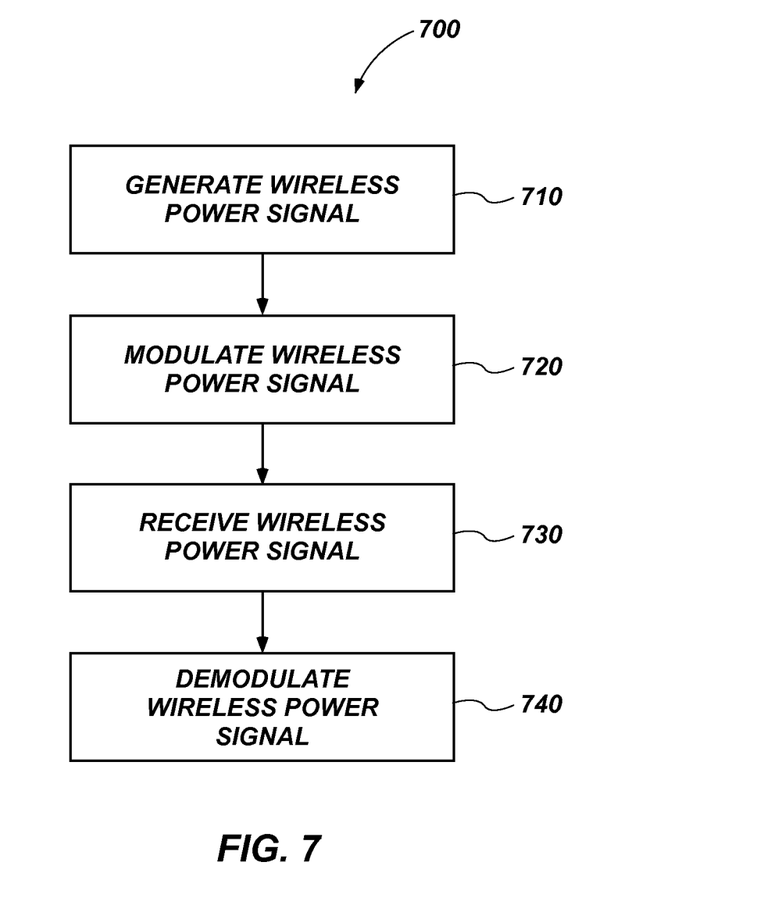
FIG. 7 is a flow chart illustrating a method for communicating between a transmitter to a receiver in an inductive wireless power transfer system.

FIG. 7 is a flow chart 700 illustrating a method for communicating between a transmitter to a receiver in an inductive wireless power transfer system. At operation 710, a wireless power signal may be generated through a transmit coil of a transmitter to a receive coil of a receiver. At operation 720, the wireless power signal on the transmitter side may be modulated for communicating data over the wireless power signal from the transmitter to the receiver. Modulating may be achieved through a number if different methods for modulating the conversion gain of the system. For example, modulating the wireless power signal on the transmitter side may include adjusting a switching frequency of switches of an inverter of the transmitter, adjusting a duty cycle of switches of an inverter of the transmitter, adjusting an impedance of the transmitter, adjusting an effective voltage received by the transmit coil of the transmitter. Adjusting an effective voltage received by the transmit coil of the transmitter may include controlling a switch network of an inverter of the transmitter to have offsetting phases. Another example of modulating the wireless power signal on the transmitter side may include adjusting an input voltage to the transmitter, such as through a switching regulator, LDO, etc.

At operation 730, on the receiver side, the wireless power signal may be received through the receive coil. At operation 740, the wireless power signal may be demodulated. Demodulating may be achieved through a number if different methods. For example, if the modulated wireless power signal is modulated by adjusting either the switching frequency or the duty cycle of the inverter, demodulation may be achieved by monitoring the driver of the rectifier of the receiver to obtain timing information. Another method includes monitoring the output voltage on the receiver side to detect fluctuations representative of the modulated data encoded on the wireless power signal.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. An inductive wireless power transfer device, comprising:
   a transmitter, comprising:
      a transmit coil configured to generate a wireless power signal to a coupling region in response to an input voltage;
      a modulator configured to modulate the wireless power signal and encode data with the wireless power signal to establish a back-channel communication link from the transmitter to a receiver, and is configured to increase the control characteristic from a baseline level to be a logic '1' bit, and decrease the control of the control characteristic from the baseline level to be a logic '0' bit; and
      an inverter configured to generate a time varying current through the transmit coil having a frequency for the wireless power signal, and wherein the inverter includes a switch network controlled by a processor according to a switching frequency, wherein the modulator is configured to adjust a control characteristic of the inverter to modulate the wireless power signal.

2. The inductive wireless power transfer device of claim 1, wherein the control characteristic a switching frequency of the switch network.

\* \* \* \* \*